(12) United States Patent  
Pritchett

(10) Patent No.: US 8,739,041 B2  
(45) Date of Patent: May 27, 2014

(54) EXTENSIBLE VIDEO INSERTION CONTROL

(75) Inventor: Thaddeus C. Pritchett, Edmonds, WA (US)

(73) Assignee: Microsoft Corporation, Redmond, WA (US)

(*) Notice: Subject to any disclaimer, the term of this patent is extended or adjusted under 35 U.S.C. 154(b) by 151 days.

(21) Appl. No.: 12/817,780

(22) Filed: Jun. 17, 2010

(65) Prior Publication Data

US 2011/0314380 A1     Dec. 22, 2011

(51) Int. Cl.
*G06F 3/00* (2006.01)
*G06Q 30/00* (2012.01)
*H04N 5/93* (2006.01)
*H04N 7/025* (2006.01)

(52) U.S. Cl.
USPC ............ 715/723; 715/720; 705/14.4; 725/42; 386/278

(58) Field of Classification Search
USPC .................... 715/720, 723; 705/14.4; 725/42; 386/278
See application file for complete search history.

(56) References Cited

U.S. PATENT DOCUMENTS

| | | |
|---|---|---|
| 6,584,273 B1 | 6/2003 | Ashley et al. |
| 6,993,081 B1 | 1/2006 | Brunheroto et al. |
| 7,007,096 B1 | 2/2006 | Lisitsa et al. |
| 2006/0075449 A1 | 4/2006 | Jagadeesan et al. |
| 2008/0126226 A1* | 5/2008 | Popkiewicz et al. ............ 705/27 |
| 2008/0141317 A1 | 6/2008 | Radloff et al. |
| 2009/0115901 A1 | 5/2009 | Winter et al. |

FOREIGN PATENT DOCUMENTS

| | | | |
|---|---|---|---|
| CN | 1231039 | 10/1999 | |
| CN | 101431682 | 5/2009 | |
| WO | WO 2009/144464 A1 * | 12/2009 | ............ G11B 27/034 |

OTHER PUBLICATIONS

Sheldrick, Wayne., "Business Models: Digital Program Insertion", Retrieved at << http://broadcastengineering.com/mag/broadcasting_business_models_digital/ >>, Jul. 1, 2002, pp. 4.
"Edirol V-440HD 8 Channel Video Mixer/ Live Switcher + Chroma keyer!", Retrieved at << http://dvcreators.net/products/mixersv440. html >>, Retrieved Date: Feb. 2, 2010, pp. 4.
"Video Composition", Retrieved at << http://www.neatware.com/player/mixing.html >>, Retrieved Date: Feb. 2, 2010, pp. 4.
"DirectShow 3D Video Mixer Filter 1.0b", Retrieved at << http://www.freedownloadmanager.org/downloads/DirectShow_3D_Video_Mixer_Filter_56115_p/ >>, Retrieved Date: Feb. 2, 2010, pp. 2.
"MediaPump", Retrieved at << http://www.optibase.com/MediaPump/ >>, Retrieved Date: Feb. 2, 2010, pp. 3.
Webb, Travis., "Media Moguls via Live Streaming", Retrieved at << http://www.linkroll.com/Computers-and-Technology--195516-Media-Moguls-via-Live-Streaming.html >>, May 2009, pp. 4.
"Foreign Office Action", Chinese Application No. 201110172746.7, (Jan. 28, 2013), 9 pages.
"Foreign Office Action", Chinese Application No. 201110172746.7, (May 10, 2013), 8 pages.
"Foreign Office Action", Chinese Application No. 201110172746.7, (Aug. 8, 2013), 9 Pages.

* cited by examiner

*Primary Examiner* — Andrea Long
(74) *Attorney, Agent, or Firm* — Wolfe-SBMC

(57) ABSTRACT

Extensible video insertion control is described. In embodiments, a media asset is received to render as video for display. Mapped video data is also received that identifies object insertion spaces in the media asset. A selectable display object is received that conforms to an object insertion space in a scene of the media asset. A composite video is then generated that includes the selectable display object inserted for display in the scene of the media asset at the object insertion space.

20 Claims, 7 Drawing Sheets

EXTENSIBLE VIDEO INSERTION CONTROL

BACKGROUND

Traditional broadcast media technologies are typically a top-down content distribution and monetization approach that limits the ability to deliver and charge for custom experiences directed to viewers in and around the media content that is delivered for viewing, or consumption. Typically media content producers and broadcasters work together to pre-author the media content in a way that allows commercial and advertisement insertion, which is completed before the media content is transmitted to end consumers of the media content.

SUMMARY

This summary is provided to introduce simplified concepts of extensible video insertion control that are further described below in the Detailed Description. This summary is not intended to identify essential features of the claimed subject matter, nor is it intended for use in determining the scope of the claimed subject matter.

Extensible video insertion control is described. In embodiments, a media asset is received to render as video for display. Mapped video data is also received that identifies object insertion spaces in the media asset. A selectable display object is received that conforms to an object insertion space in a scene of the media asset. A composite video is then generated that includes the selectable display object inserted for display in the scene of the media asset at the object insertion space.

In other embodiments, the composite video can be re-generated to include an alternate selectable display object that is inserted for display in the scene of the media asset at the object insertion space. The selectable display object and/or the alternate selectable display object can be advertisements that correlate to a context of a viewer of the media asset, and the advertisements are selected to display in the scene of the media asset while the viewer watches the video. An object insertion space may be a blank space within the scene of the media asset, and an advertisement is displayed as a video or a static image over the blank space that moves in relation to objects displayed in the scene. In an embodiment, the viewer may initiate a content navigation input, such as to jump past the scene of the media asset that includes the selectable display object inserted for display. The composite video can then be re-generated to include the selectable display object inserted for display in a subsequent scene at an additional object insertion space in the media asset.

BRIEF DESCRIPTION OF THE DRAWINGS

Embodiments of extensible video insertion control are described with reference to the following drawings. The same numbers are used throughout the drawings to reference like features and components.

DETAILED DESCRIPTION

Extensible video insertion control is described. In embodiments, a media asset, such as a movie or other video, can be analyzed and mapped to locate spaces in which displayable objects, such as advertisements, can be inserted to display along with the media asset, such as in a scene of a movie. For example, a scene in a movie may include wall space in a room, a billboard in the background, a television in a room that is turned off, a sign that may be imaged over, or any other similar spaces or flat surfaces over which an advertisement can be displayed. A media asset can be analyzed to spatially and temporally locate and track object insertion spaces in the media content. An advertisement that is inserted as a displayable object in a scene of a media asset can be inserted as a motion video or a static image over an object insertion space.

While features and concepts of the described systems and methods for extensible video insertion control can be implemented in any number of different environments, systems, and/or various configurations, embodiments of extensible video insertion control are described in the context of the following example systems and environments.

Figure 1:
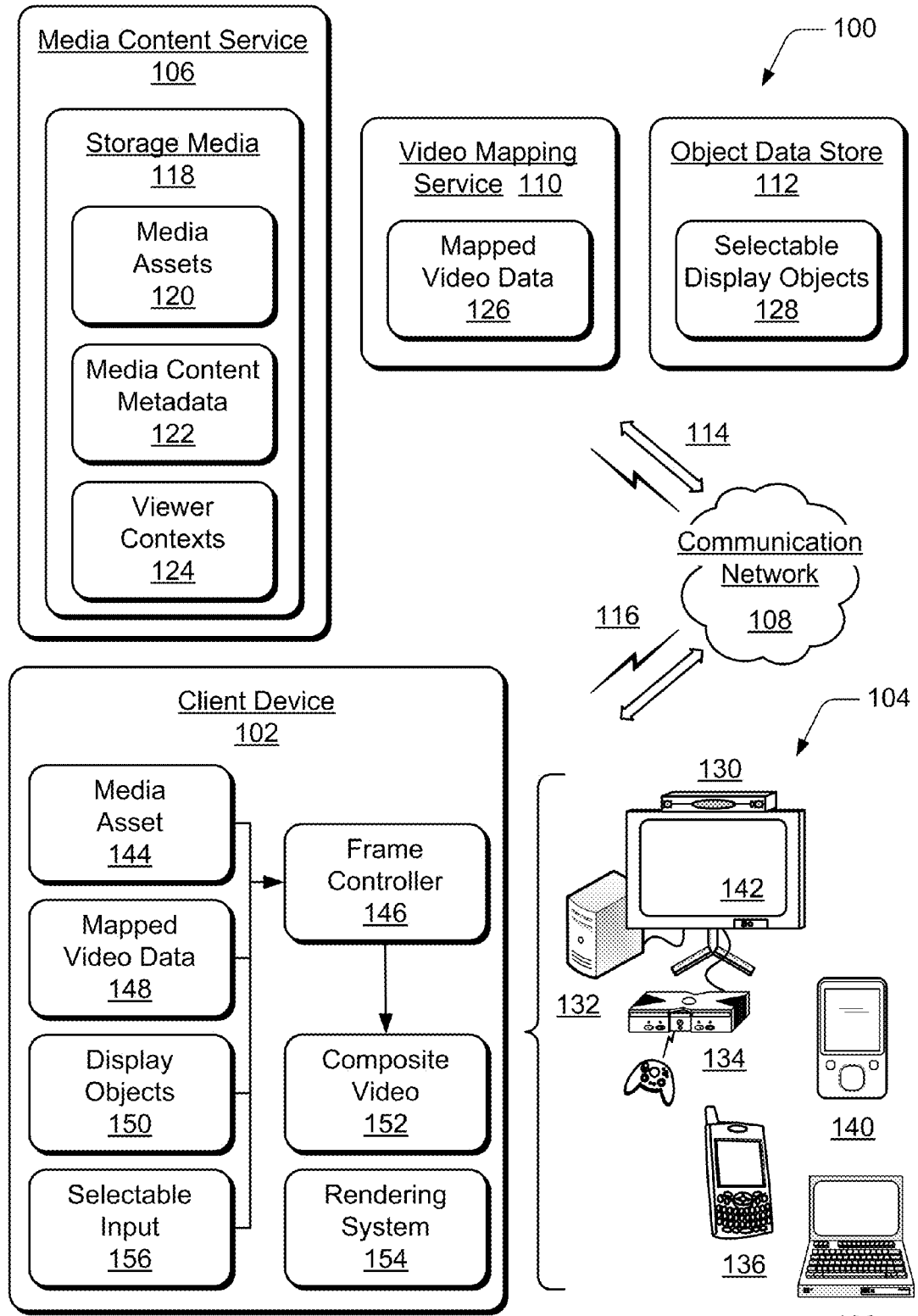
FIG. 1 illustrates an example system in which embodiments of extensible video insertion control can be implemented.

FIG. 1 illustrates an example system 100 in which various embodiments of extensible video insertion control can be implemented. The example system 100 includes a client device 102, which may be configured as any type of client device 104. Some of the various client devices 104 include wired and/or wireless devices, and may also be referred to as user devices and/or portable devices. The example system 100 also includes a media content service 106 that communicates or otherwise provides media content and data to any number of the various client devices 104 via a communication network 108. The example system 100 also includes a video mapping service 110 and an object data store 112.

The communication network 108 can be implemented to include a broadcast network, an IP-based network 114, and/or a wireless network 116 that facilitates media asset distribution and data communication between the media content service 106, the video mapping service 110, the object data store 112, and any number of the various client devices. The communication network 108 can also be implemented using any type of network topology and/or communication protocol, and can be represented or otherwise implemented as a combination of two or more networks. The communication network 108 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

The media content service 106 can include media content servers to communicate, or otherwise distribute, media content and/or other data to any number of the various client devices. In this example system 100, the media content service 106 includes a storage media 118 to store or otherwise maintain various media content and data, such as media assets 120 and media content metadata 122. The storage media 118 can be implemented as any type of memory and/or suitable electronic data storage. Additionally, the media content service 106 may be implemented as a subscription-based service from which any of the various client devices 104 can request media assets 120 to download and display for viewing, or otherwise render for playback. The media content service 106 manages the media asset distribution to the various client devices 104, such as when a request for a media asset 120 is received from a client device 104, and the media content service 106 communicates or provides data segments of the media asset to the client device.

The media assets 120 can include any type of audio, video, and/or image data received from any type of media content source or data source. As described throughout, media assets are media content, and media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.). A media asset 120 may also include various display formats of the media asset, such as a highest quality display format (e.g., a highest quality, high-definition display format) to a lower quality display format (e.g., a lower quality, standard-definition display format), and any other quality of display format along a continuum between the two.

The media content metadata 122 can include any type of identifying criteria, descriptive information, and/or attributes associated with the media assets 120 that describes and/or categorizes the media assets. For example, metadata can include a media asset identifier, title, subject description, a date of production, artistic information, music compilations, and any other types of descriptive information about a particular media asset. Further, metadata can characterize a genre that describes a media asset, such as video content, as being an advertisement, a movie, a comedy show, a sporting event, a news program, a sitcom, a talk show, an action/adventure program, or as any number of other category descriptions.

In this example system 100, the media content service 106 also includes viewer contexts 124 that may be any type of viewer-related information, such as pertaining to a user of the client device 102. A viewer context may be based on social network groups, social contacts, media content that has been selected for viewing by the user, television programming channels that are selected for viewing, other media content viewing habits, and the like. The media content service 106 can also be implemented with any number and combination of differing components as further described with reference to the example device shown in FIG. 8. Additionally, any of the media content service 106, the video mapping service 110, and the object data store 112 can be provided as an independent service (e.g., on a separate server or by a third party service), or may all be combined as one service, such as with the media content service 106.

In embodiments, the video mapping service 110 is implemented to generate mapped video data 126 that is created to identify object insertion spaces in a media asset. For example, a scene in a movie may include wall space in a room, a billboard in the background, a television in a room that is turned off, a sign that may be imaged over, or any other similar spaces over which an advertisement can be displayed. Additionally, an advertisement that is inserted as a displayable object in a scene of a media asset can be inserted as a motion video or a static image over an object insertion space. In embodiments, the mapped video data 126 is a rendering of synchronous movement of the object insertion spaces in the various scenes of the media asset.

To generate the mapped video data 126, the video mapping service 110 can perform an offline analysis of a media asset for space dimensional accuracy and then for time dimensional accuracy, and analyze the media asset as delivered to a client device (e.g., broadcast or via broadband). The offline analysis of the media asset (e.g., audio/video media content) can be performed independently from delivery of the content to a client device. The analysis for space dimensional accuracy can use any combination of image recognition, edge detection, surface point identification, knowledge of the physical function of the image identified (e.g., arms, hands, or fingers), and stereoscope location of an object based on a size and location of the object from one or more camera angles to create a three dimensional rendering of objects in the original media content. In an implementation, triangles are used between the objects in the original media content to spatially and temporally locate and track object insertion spaces in the media content as ratios and angles of the triangles move and change relative to the motion of the other objects in a scene of the media asset.

A three dimensional image space defining replaceable objects or open spaces can then identified and replaced with a three dimensional object (e.g., also referred to as a green-screen object). The three dimensional object can then be re-rendered in two dimensions based on the object's three dimensional position relative to the rest of the media content. The result is a sequence of frames in which a new object can be inserted into the original media content, and the new object appears as though it were part of the original content. The resulting green-screen objects and/or three dimensional rendering can then be used to author a selection of new content, based on arbitrary replacement objects, that can be mixed with the original media content with positional accurate clipping of the green-screen objects in the media asset.

Relative two or three dimensional positions of objects, edges, and surface points resulting from the analysis for space dimensional accuracy can then be computed for two or more such objects, edges, or surface points. If these objects are moving relative to each other in the original media content, then the ratios of the distance between the objects can be correlated to the time offset of the independently authored green-screen video produced by the analysis for space dimensional accuracy. Time stamps can then be combined with a two dimensional rendering of the two or more objects for later comparison to the independently delivered original media content.

The results of the offline analysis of the original media content can be used as a seed for location of identified objects in the actual broadcast or other independent delivery of the original media content. The real time analysis can then locate the objects in a series of frames and compare the ratios of distances between objects in the media content that is delivered to a client device. The ratios of the distances between the objects can then be used to compute a relative time or frame offset in the independently delivered media content that is comparable to the offset computed by offline analysis such that independently generated content can be spliced, overlaid, or otherwise mixed with the delivery of the original media content with frame accurate synchronization. In an implementation, the real time analysis is performed as frequently as needed to keep the independent streams in sync. For instance, the beginning of each otherwise unedited clip of original media content can be identified by the real time analysis and for the duration in which independently authored content is spliced, overlaid, or otherwise mixed with the original media content.

The object data store 112 maintains selectable display objects 128 that can be advertisements which are selected for display in an object insertion space in a scene of the two dimensional rendering of a media asset, as determined by the video mapping service 110. An advertisement can be displayed as a video or a static image over the blank space (e.g., object insertion space) that moves in relation to other objects displayed in a scene of the media asset. A particular selectable display object 128 may be selected not only for how well it fits into a particular object insertion space for display, but also based on advertising agreements, user preferences, a correlation with a viewer context, a geographic location of a viewer, based on a time of day, a particular day of the week, and/or based on any number of content distribution and business criteria. In an implementation, each selectable display object 128 has an object identifier that can be correlated with a space identifier of an object insertion space in a media asset.

Various embodiments of extensible video insertion control provide that viewer experiences can be personalized at any granularity from geological groupings such as cities, to social groupings such as parenting societies, down to individual preferences. Extensible video insertion control also enables frame accurate combining of advertising or other media content from multiple sources with an original media asset (e.g., audio/visual media content). For example, the media content to be combined with an original media asset may be any one or combination of audio, video, image, webpage, gaming, or other application specific content. The media content to be combined can be spliced at any point into the original media asset, where a point of insertion can be determined and customized after the media asset is delivered or broadcast to a client device.

The media content to be combined with an original media asset can be inserted with frame accuracy that enables overlaid or underlaid moving images, and the overlays can be determined based on the time and place of rendering the media asset, as well as taking into account the context of an individual viewer or group of viewers. Further, the media content to be combined may be pre-authored based on the analysis of existing original media content, may be pre-authored independent of any analysis of the original media content, may be authored at a rendering client device based on the analysis of the existing original media content, may be authored at a rendering client device independent of any analysis of the original media content, and/or authored in real time at the client device or devices that are rendering the content for display.

In the example system 100, a client device 104 can be implemented as any one or combination of a television client device 130 (e.g., a television set-top box, a digital video recorder (DVR), etc.), a computer device 132, a gaming system 134, an appliance device, an electronic device, and/or as any other type of client device or user device that may be implemented to receive media content in any form of audio, video, and/or image data. The various client devices 104 can also include wireless devices implemented to receive and/or communicate wireless data, such as any one or combination of a mobile phone 136 (e.g., cellular, VoIP, WiFi, etc.), a portable computer device 138, a media device 140 (e.g., a personal media player, portable media player, etc.), and/or any other wireless device that can receive media content in any form of audio, video, and/or image data. A client system can include a respective client device and display device 142 that together render or playback any form of audio, video, and/or image media content and media assets. The display device 142 can be implemented as any type of a television, high definition television (HDTV), LCD, or similar display system.

Any of the various client devices 104 can be configured as the client device 102 and implemented with one or more processors, communication components, memory components, signal processing and control circuits, and a media content rendering system. Further, any of the client devices 104 can be implemented with any number and combination of differing components as further described with reference to the example device shown in FIG. 8. A client device may also be associated with a user (i.e., a person) and/or an entity that operates the device such that a client device describes logical devices that include users, software, and/or a combination of devices.

The example client device 102 can receive and playback a media asset 144 from the media content service 106 or from any other media content source. The client device 102 includes a frame controller 146 that can be implemented as computer-executable instructions and executed by one or more processors to implement the various embodiments described herein for extensible video insertion control. The client device 102 can receive, via one or more data inputs over the communication network 108, the media asset 144 to render as video for display (e.g., on the display device 142), receive mapped video data 148 from the video mapping service 110, and receive one or more selectable display objects 150 from the object data store 112.

The selectable display objects 150 conform to an object insertion space in a scene of the media asset 144, and in an embodiment, the selectable display objects 150 correlate to a context of a viewer of the media asset. The frame controller 146 can then generate a composite video 152 that includes a selectable display object 150 inserted for display in the scene of the media asset at the object insertion space. The frame controller synchronizes frames of the scene that includes the object insertion space with the mapped video data 148 to insert the selectable display object 150 for display in the scene of the media asset and generate the composite video 152. The client device 102 also includes a rendering system 154 that can render the composite video 152 to display the selectable display object 150 in the scene of the media asset while the scene is displayed for viewing (e.g., on the display device 142).

In embodiments, the frame controller 146 can select a selectable display object or an alternate selectable display object to insert for display in the scene of the media asset. For example, the media asset may be stored or saved at the client device 102 when received from the media content service 106. The frame controller 146 can generate the composite video 152 that includes a selectable display object 150 inserted for display in the scene of the media asset at the object insertion space when the media asset is selected by a viewer for playback at the client device. Subsequently, the frame controller 146 can re-generate the composite video 152 that includes a different, alternate selectable display object 150 inserted for display in the scene of the media asset at the object insertion space when the media asset is again selected by a viewer for playback at the client device. Alternate selectable display objects may be selected based on such factors as a time of the day, a day of the week, based on a particular viewer at the client device 102, and/or based on a viewer context 124.

In other embodiments, the frame controller 146 is also implemented to receive a selectable input 156, such as a content navigation input that is initiated by a viewer. A content navigation input may be received as an input to jump advance in the media asset, a fast-forward advance of the media asset, a jump back in the media asset, a rewind of the media asset, or a change to stop playback of the media asset and start playback of a different media asset. For example, the frame controller 146 may receive a content navigation input to jump advance past the scene of the media asset that includes the selectable display object 150 inserted for display. The frame controller 146 can then re-generate the composite video 152 to include the selectable display object 150 inserted for display in a subsequent scene at an additional object insertion space in the media asset. In this instance, the viewer is still likely to see an advertisement, for example, that has been selected as relating to a context of the viewer.

In embodiments, the frame controller 146 can utilize local analysis of a media asset 144, splice point markers in the media asset streams, and/or time stamps in the various streams in any combination to implement a frame accurate correlation between the media asset 144, the mapped video data 148, the display objects 150, and/or any selectable inputs 156 to generate the composite video 152. The frame controller 146 is implemented to merge the two or more independently authored and delivered video streams into a single rendering (e.g., the composite video 152). For example, a movie may be analyzed at the video mapping service 110 and mapped with three dimensional green-screen overlays that are independently delivered to the client device as the mapped video data 148. The frame controller 146 can combine the media asset 144 and the mapped video data 148 with multiple other three dimensional or two dimensional image delivery streams to merge audio and/or new objects (e.g., the display objects 150) into the original media content stream to appear as part of the original media asset when rendered for display.

The frame controller 146 is also implemented to provide that screens, commercials, or other audio/visual content or application to be displayed, skipped, or otherwise manipulated based on user interactions and business rules which may be put in place independent of the original and supplemental media content delivery. In an example, the client device 102 renders the media asset 144 and the frame controller 146 tracks the time and date of rendering along with available splice points in the media asset, while queuing up a number of advertisements (e.g., display objects 150) that are selected for a particular viewer at the time and date. The frame controller 146 can also enforce any combination of a time duration for advertisement viewing by the viewer based on content navigation inputs (e.g., selectable inputs 156), such as when the viewer initiates an input to jump advance in the media asset, a fast-forward advance of the media asset, a jump back in the media asset, a rewind of the media asset, or a change to stop playback of the media asset and/or start playback of a different media asset.

Figure 2:
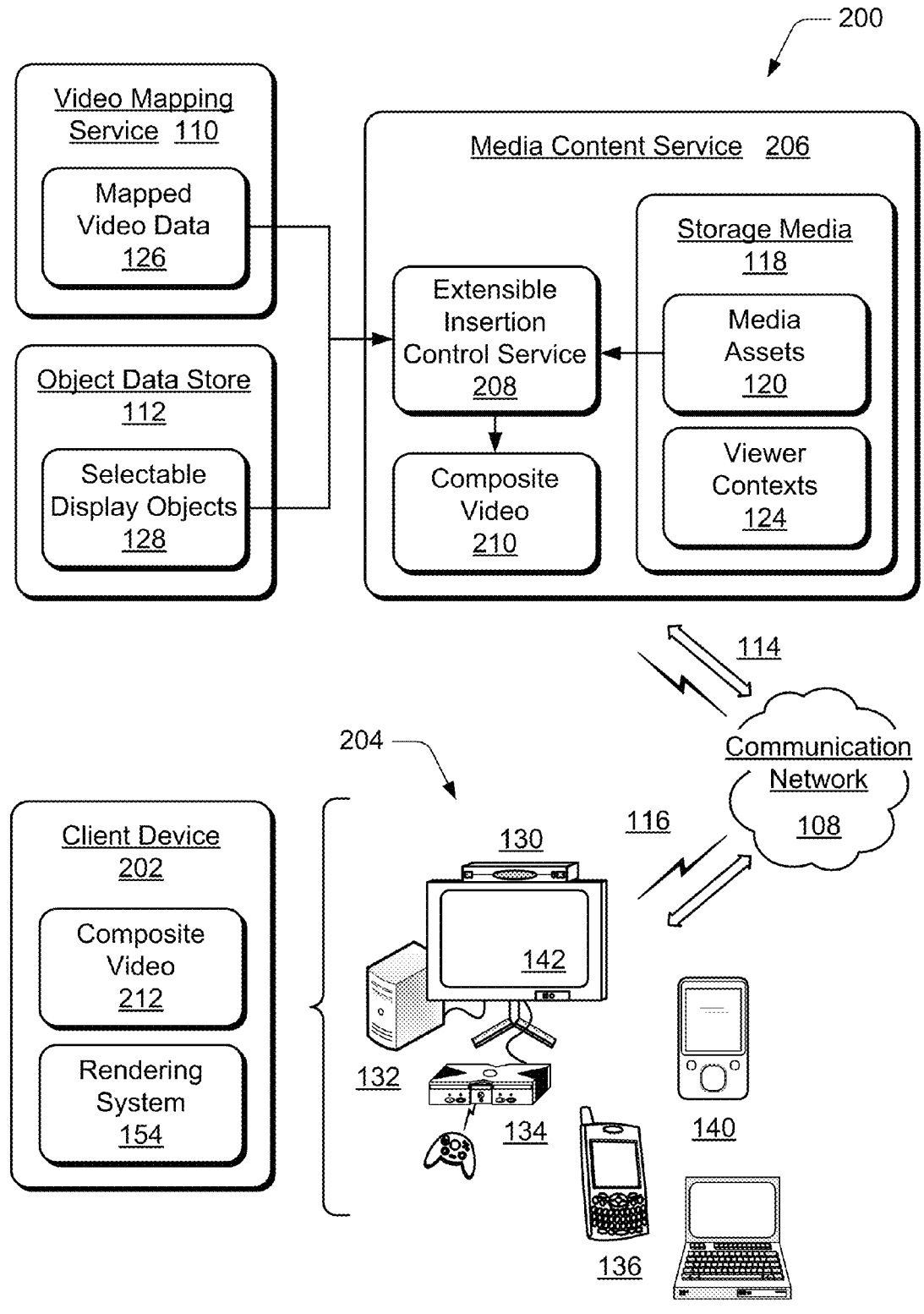
FIG. 2 illustrates another example system in which embodiments of extensible video insertion control can be implemented.

FIG. 2 illustrates another example system 200 in which various embodiments of extensible video insertion control can be implemented. The example system 200 includes a client device 202 that may be configured as any type of client device 204, examples of which are described with reference to the various client devices shown in FIG. 1. The example system 200 also includes a media content service 206 that communicates or otherwise provides media content and data to any number of the various client devices 204 via the communication network 108. The example system 200 also includes the video mapping service 110 that generates the mapped video data 126, and includes the object data store 112 that maintains the selectable display objects 128. The video mapping service 110 and the object data store 112 are also described with reference to FIG. 1.

The media content service 206 may be implemented as described with reference to the media content service 106 shown in FIG. 1. Additionally in this example 200, the media content service 206 includes an extensible insertion control service 208 that can be implemented as computer-executable instructions and executed by one or more processors to implement the various embodiments described herein for extensible video insertion control.

The extensible insertion control service 208 can receive a media asset 120, mapped video data 126 from the video mapping service 110, and selectable display objects 128 from the object data store 112. The extensible insertion control service 208 can then generate a composite video 210 that includes a selectable display object 128 inserted for display in a scene of the media asset 120 at an object insertion space. The media content service 206 can then deliver the composite video 210 to the client device 202 (e.g., received as composite video 212) via the communication network 108 to render the video for display.

In embodiments, the extensible insertion control service 208 can be implemented as described with reference to the frame controller 146 shown in FIG. 1. The extensible insertion control service 208 is implemented between the multiple media and application rendering pipelines via which audio, video, and other content frames are delivered, and the client device 202. The extensible insertion control service 208 can also receive business and context information to locate and create source frame pipelines, and correlate relative presentation times along with viewer inputs to combine frames and generate the composite video 210. The extensible insertion control service 208 can utilize any combination of business rules, content sources, and viewer contexts 124 (e.g., a date, time, device, individual identification, social connections, etc.) to select and build multiple content source streams. The presentation times of these pipelines are then computed and compared so that audio and video frames can be pulled from one stream and spliced, overlaid, or otherwise mixed with any combination of audio and video frames pulled from any of the other time synched streams. The extensible insertion control service 208 can receive frames from one or more green-screen renderings of the original media content with relative Z-orders for the frames. In parallel, the control service 208 can receive time or frame synchronized frames for any number of independently authored selectable display objects 128. These frames can then be mixed based on traditional green-screen overlays, and with relative Z-ordering.

Figure 3:
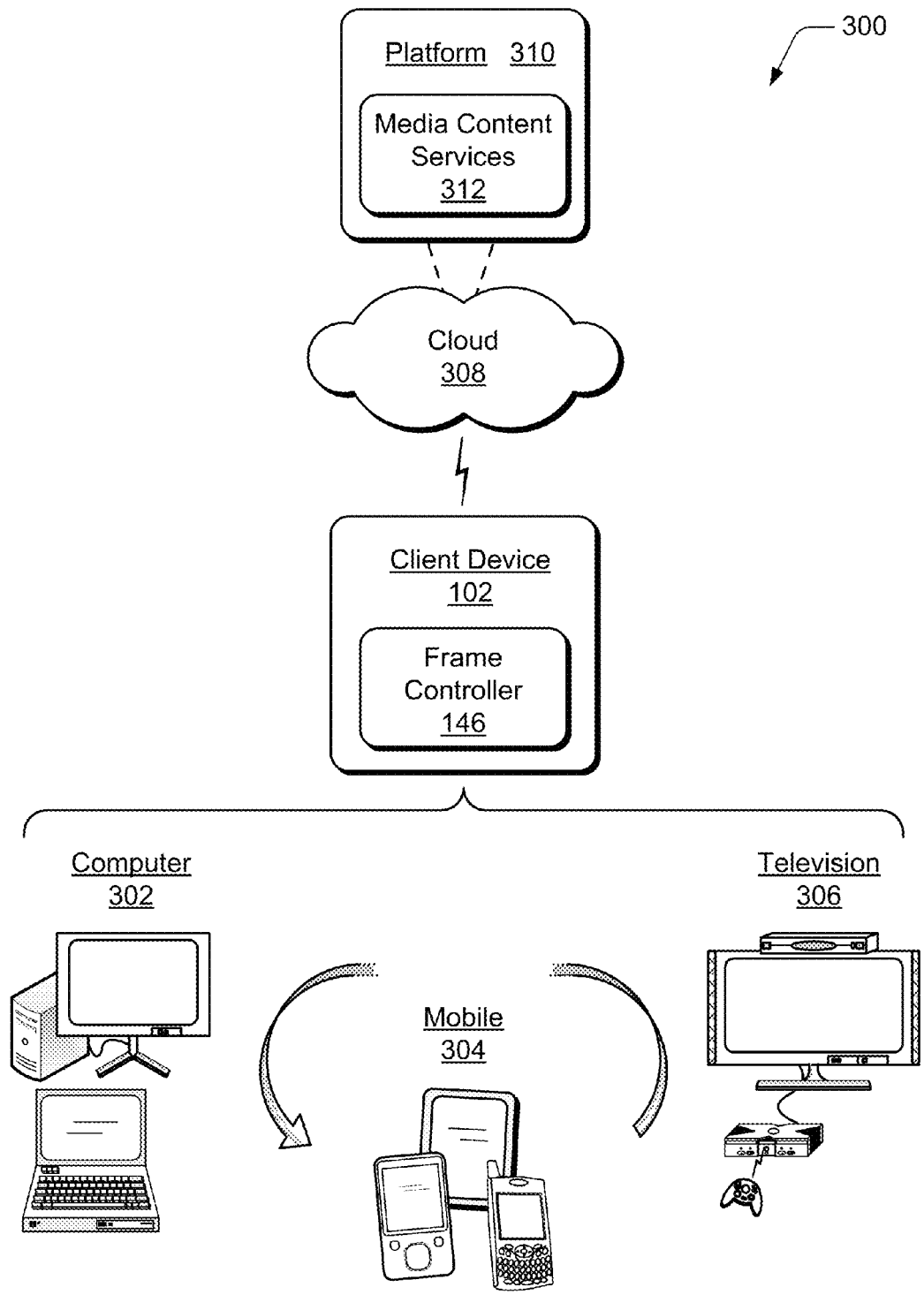
FIG. 3 illustrates an example system with multiple devices that can implement various embodiments of extensible video insertion control for a seamless user experience in ubiquitous environments.

FIG. 3 illustrates an example system 300 that includes the client device 102 as described with reference to FIG. 1. The example system 300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 302, mobile 304, and television 306 uses. Each of these configurations includes devices that may have generally different constructs and capabilities, and thus the client device 102 may be configured according to one or more of the different device classes. For instance, the client device 102 may be implemented as the computer 302 class of a device that includes a personal computer, desktop computer, a multi-screen computer, laptop computer, netbook, and so on.

The client device 102 may also be implemented as the mobile 304 class of device that includes mobile devices, such as a mobile phone, portable music player, portable gaming device, a tablet computer, a multi-screen computer, and so on. The client device 102 may also be implemented as the television 306 class of device that includes devices having or connected to generally larger screens in casual viewing environments. These devices include televisions, set-top boxes, gaming consoles, and so on. The techniques described herein may be supported by these various configurations of the client device 102 and are not limited to the specific examples of extensible video insertion control described herein.

The cloud 308 includes and/or is representative of a platform 310 for media content services 312. The platform 310 abstracts underlying functionality of hardware (e.g., servers) and software resources of the cloud 308. The media content services 312 may include applications and/or data that can be utilized while computer processing is executed on servers that are remote from the client device 102. For example, the media content services 312 may include the video mapping service 110 as described with reference to FIG. 1 and/or may include the extensible insertion control service 208 as described with reference to FIG. 2. Media content services 312 can be provided as a service over the Internet and/or through a subscriber network, such as a cellular or WiFi network.

The platform 310 may abstract resources and functions to connect the client device 102 with other computing devices. The platform 310 may also serve to abstract scaling of resources to provide a corresponding level of scale to encountered demand for the media content services 312 that are implemented via the platform 310. Accordingly, in an interconnected device embodiment, implementation of functionality of the frame controller 146 may be distributed throughout the system 300. For example, the frame controller 146 may be implemented in part on the client device 102 as well as via the platform 310 that abstracts the functionality of the cloud 308.

Example methods 400, 500, 600, and 700 are described with reference to respective FIGS. 4, 5, 6, and 7 in accordance with one or more embodiments of extensible video insertion control. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
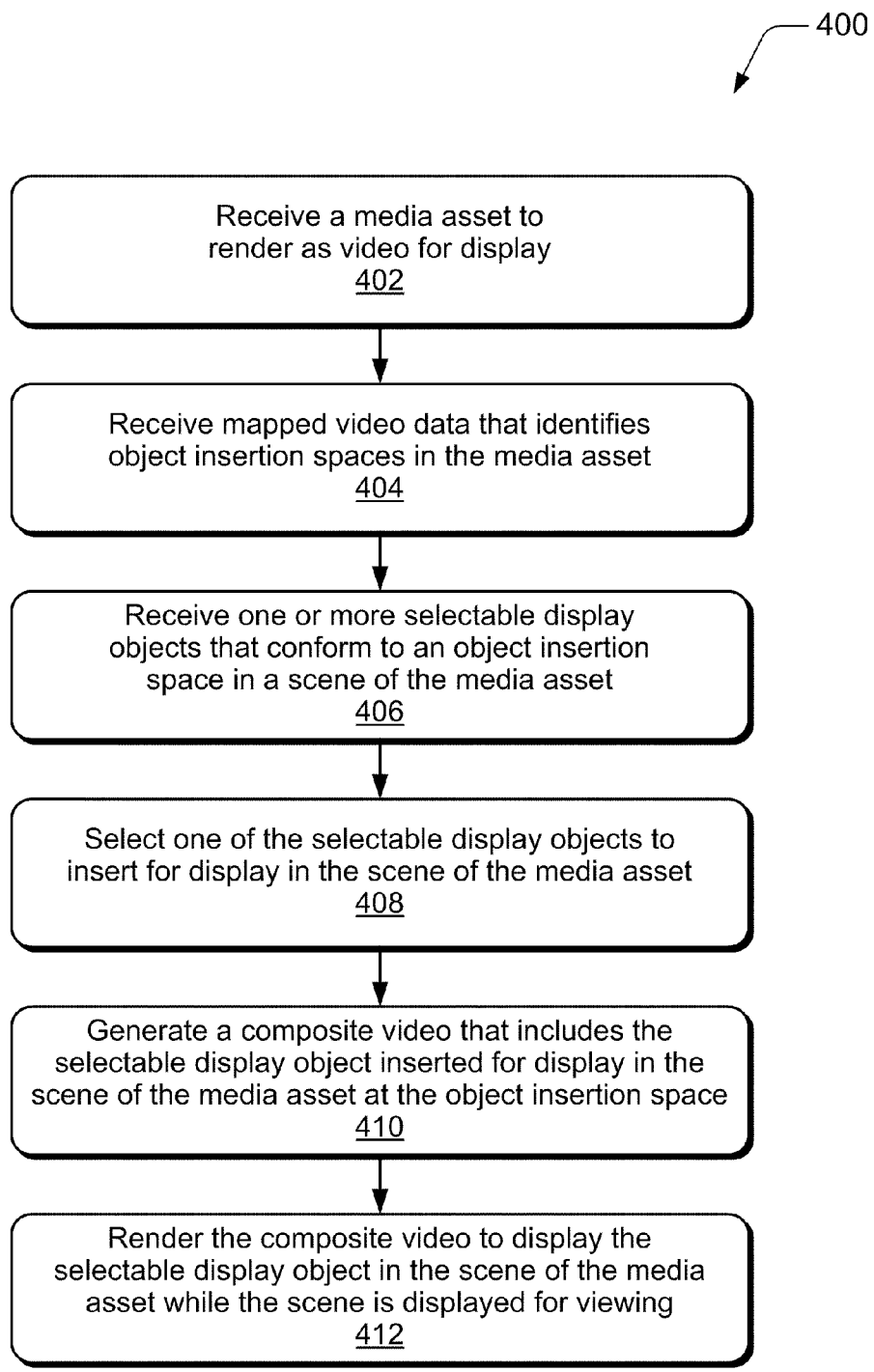
FIG. 4 illustrates example method(s) of extensible video insertion control in accordance with one or more embodiments.

FIG. 4 illustrates example method(s) 400 of extensible video insertion control, and is described with reference to a client device. The order in which the method blocks are described are not intended to be construed as a limitation, and any number of the described method blocks can be combined in any order to implement a method, or an alternate method.

At block 402, a media asset is received to render as video for display. For example, the client device 102 receives the media asset 144 from the media content service 106 or from any other media content source. The client device 102 can receive the media asset 144 to render as video for display. At block 404, mapped video data is received that identifies object insertion spaces in the media asset. For example, the client device 102 receives the mapped video data 148 from the video mapping service 110. In an embodiment, the mapped video data 148 is a rendering of synchronous movement of an object insertion space in a scene of the media asset.

At block 406, one or more selectable display objects that conform to an object insertion space in a scene of the media asset are received. For example, the client device 102 receives one or more selectable display objects 150 from the object data store 112. A selectable display object 150 can correlate to a context 124 of a viewer of the media asset. In an embodiment, a selectable display object 150 is an advertisement displayed as a video or static image over the object insertion space (e.g., a blank space in the scene of the media asset) that moves in relation to other objects displayed in the scene.

At block 408, one of the selectable display objects is selected to insert for display in the scene of the media asset. For example, the frame controller 146 at the client device 102 selects one of the selectable display objects 150 to insert for display in the scene of the media asset. At block 410, a composite video is generated that includes the selectable display object inserted for display in the scene of the media asset at the object insertion space. For example, the frame controller 146 at the client device 102 generates the composite video 152 that includes the selectable display object 150 inserted for display in the scene of the media asset at the object insertion space. The frame controller synchronizes frames of the scene that includes the object insertion space with the mapped video data 148 to insert the selectable display object 150 for display in the scene of the media asset and generate the composite video 152.

At block 412, the composite video is rendered to display the selectable display object in the scene of the media asset while the scene is displayed for viewing. For example, the rendering system 154 at the client device 102 renders the composite video 152 to display the selectable display object 150 in the scene of the media asset while the scene is displayed for viewing (e.g., on the display device 142).

Figure 5:
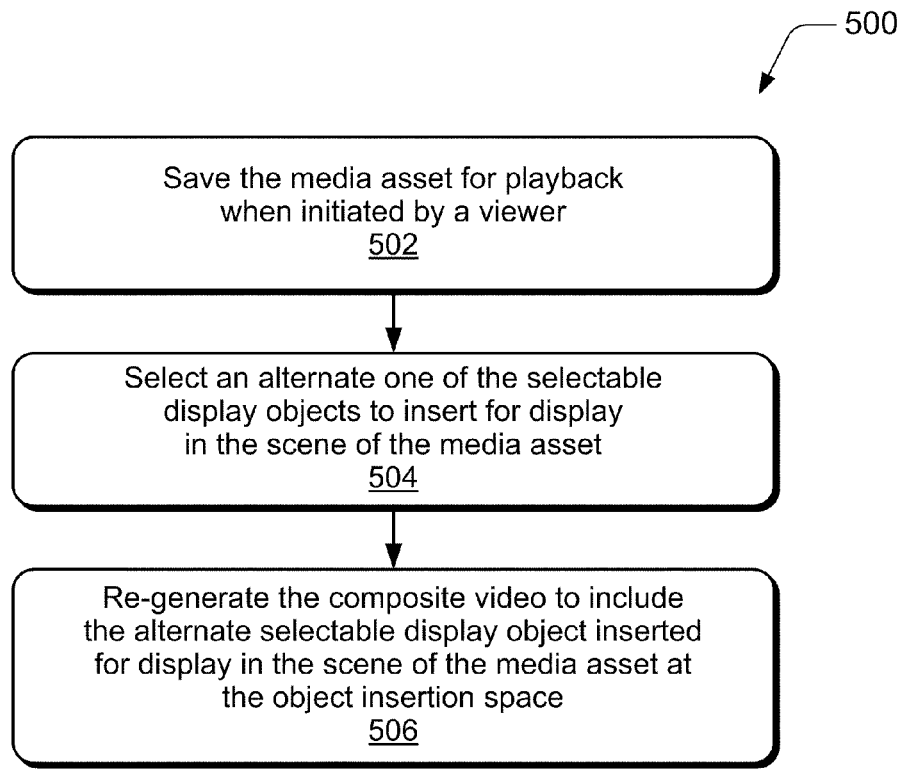
FIG. 5 illustrates additional example method(s) of extensible video insertion control in accordance with one or more embodiments.

FIG. 5 illustrates example method(s) 500 of extensible video insertion control, and is described with reference to a client device. The order in which the method blocks are described are not intended to be construed as a limitation, and any number of the described method blocks can be combined in any order to implement a method, or an alternate method.

At block 502, the media asset is saved for playback when initiated by a viewer. For example, the media asset 144 that is received by the client device 102 from the media content service 106 as described with reference to method block 402 (FIG. 4) is saved at the client device 102, and a viewer can initiate playback of the media asset for viewing when convenient for the viewer.

At block 504, an alternate one of the selectable display objects is selected to insert for display in the scene of the media asset. For example, the frame controller 146 at the client device 102 selects an alternate selectable display object 150 to insert for display in the scene of the media asset. This may be an alternate selectable display object to the selectable display object that is selected as described with reference to method block 408 (FIG. 4).

At block 506, the composite video is re-generated to include the alternate selectable display object inserted for display in the scene of the media asset at the object insertion space. For example, the frame controller 146 at the client device 102 re-generates the composite video 152 that includes the alternate selectable display object 150 inserted for display in the scene of the media asset at the object insertion space.

Figure 6:
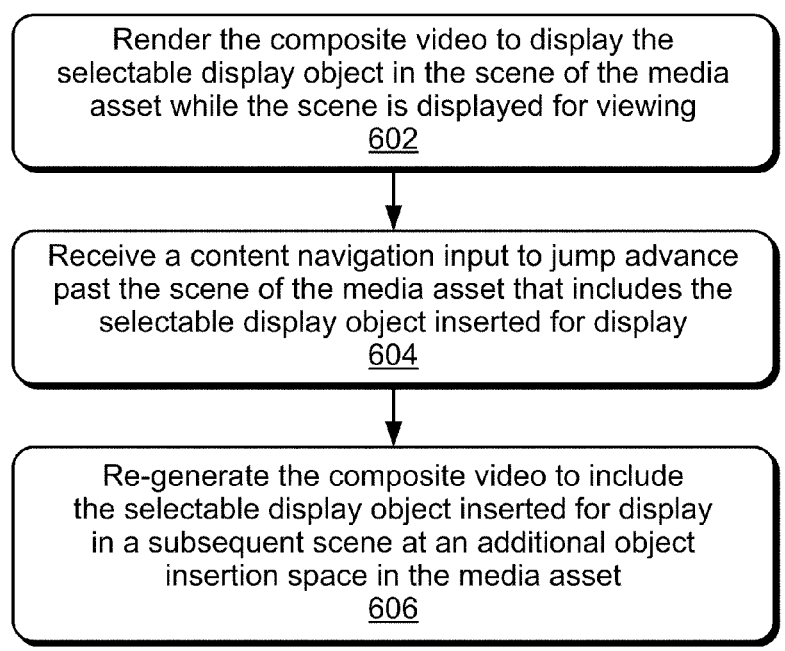
FIG. 6 illustrates additional example method(s) of extensible video insertion control in accordance with one or more embodiments.

FIG. 6 illustrates example method(s) 600 of extensible video insertion control, and is described with reference to a client device. The order in which the method blocks are described are not intended to be construed as a limitation, and any number of the described method blocks can be combined in any order to implement a method, or an alternate method.

At block 602, the composite video is rendered to display the selectable display object in the scene of the media asset while the scene is displayed for viewing. For example, the rendering system 154 at the client device 102 renders the composite video 152 to display the selectable display object 150 as described with reference to method block 412 (FIG. 4).

At block 604, a content navigation input is received to jump advance past the scene of the media asset that includes the selectable display object inserted for display. For example, a viewer at the client device 102 may initiate a content navigation input (e.g., a selectable input 156), to jump advance past the scene of the media asset that includes the selectable display object 150 inserted for display.

At block 606, the composite video is re-generated to include the selectable display object inserted for display in a subsequent scene at an additional object insertion space in the media asset. For example, the frame controller 146 then re-generates the composite video 152 to include the selectable display object 150 inserted for display in a subsequent scene at an additional object insertion space in the media asset. In this instance, the viewer is still likely to see the advertisement, for example, that has been selected as relating to a context of the viewer.

Figure 7:
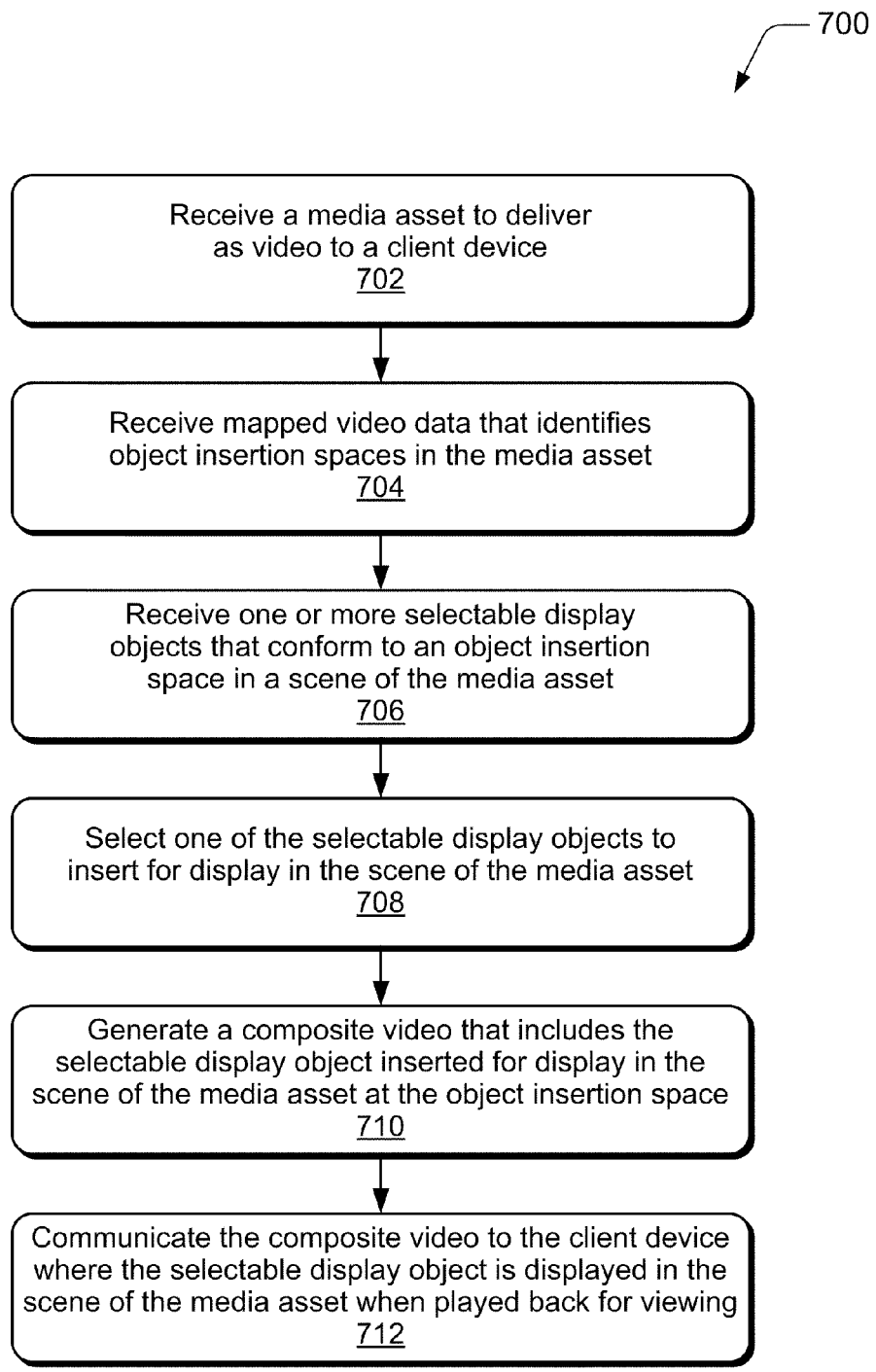
FIG. 7 illustrates additional example method(s) of extensible video insertion control in accordance with one or more embodiments.

FIG. 7 illustrates example method(s) 700 of extensible video insertion control, and is described with reference to an extensible insertion control service. The order in which the method blocks are described are not intended to be construed as a limitation, and any number of the described method blocks can be combined in any order to implement a method, or an alternate method.

At block 702, a media asset is received to deliver as video to a client device. For example, the extensible insertion control service 208 (FIG. 2) receives a media asset 120 at the media content service 106. At block 704, mapped video data is received that identifies object insertion spaces in the media asset. For example, the extensible insertion control service 208 receives the mapped video data 126 from the video mapping service 110.

At block 706, one or more selectable display objects that conform to an object insertion space in a scene of the media asset are received. For example, the extensible insertion control service 208 receives one or more selectable display objects 128 from the object data store 112. A selectable display object 150 can correlate to a context 124 of a viewer of the media asset. In an embodiment, a selectable display object 128 is an advertisement displayed as a video or static image over the object insertion space (e.g., a blank space in the scene of the media asset) that moves in relation to other objects displayed in the scene.

At block 708, one of the selectable display objects is selected to insert for display in the scene of the media asset. For example, the extensible insertion control service 208 selects one of the selectable display objects 128 to insert for display in the scene of the media asset. At block 710, a composite video is generated that includes the selectable display object inserted for display in the scene of the media asset at the object insertion space. For example, the extensible insertion control service 208 generates the composite video 210 that includes the selectable display object 128 inserted for display in the scene of the media asset at the object insertion space. The extensible insertion control service 208 synchronizes frames of the scene that includes the object insertion space with the mapped video data 126 to insert the selectable display object 128 for display in the scene of the media asset and generate the composite video 210.

At block 712, the composite video is communicated to the client device where the selectable display object is displayed in the scene of the media asset when the video is played back for viewing. For example, the media content service 206 then communicates the composite video 210 to the client device 202 (e.g., received as composite video 212) via the communication network 108. The selectable display object 128 is then displayed at the client device 202 in the scene of the media asset while the scene is displayed for viewing (e.g., on the display device 142).

Figure 8:
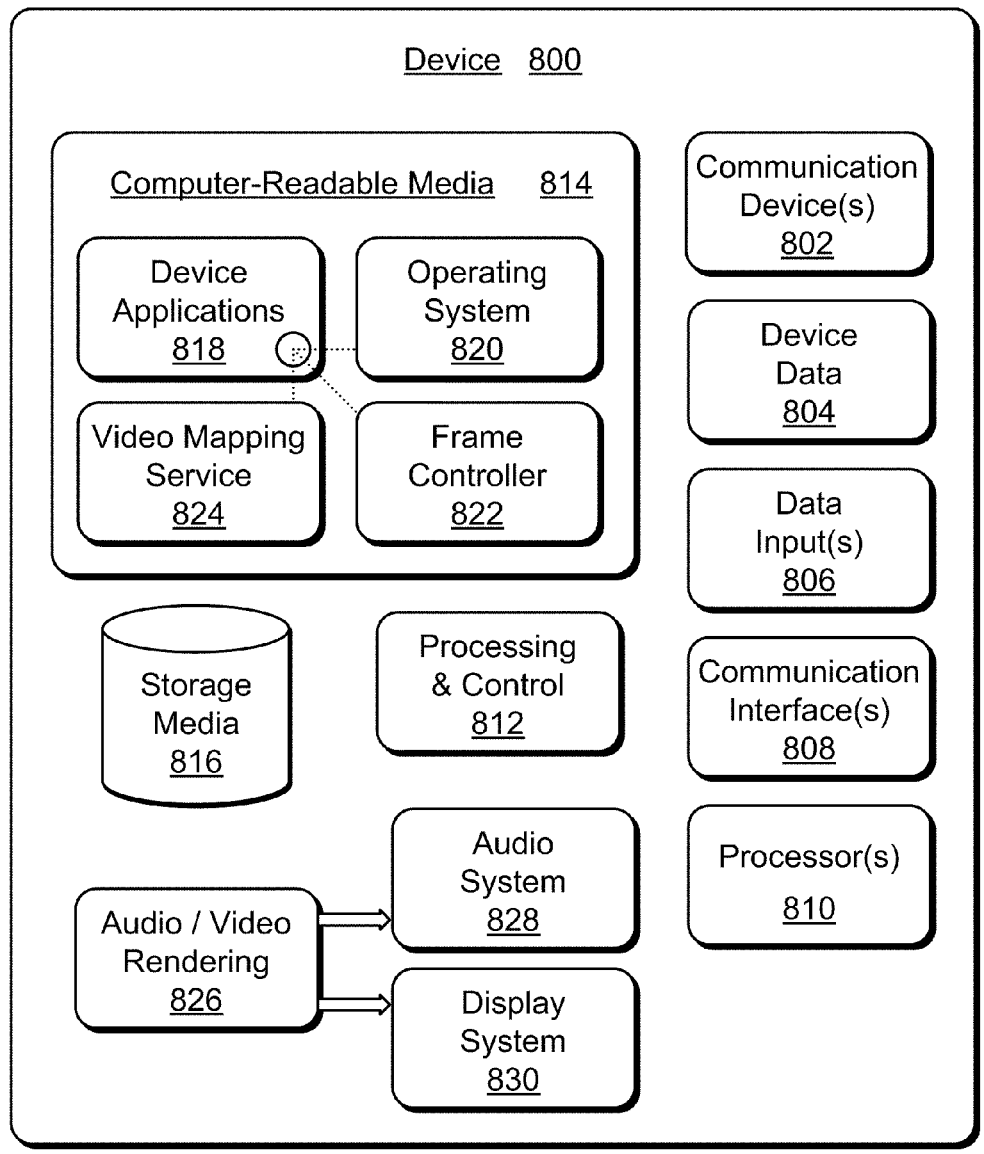
FIG. 8 illustrates various components of an example device that can implement embodiments of extensible video insertion control.

FIG. 8 illustrates various components of an example device 800 that can be implemented as any type of client and/or computing device as described with reference to the previous FIGS. 1-7 to implement embodiments of extensible video insertion control. In embodiments, device 800 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 800 may also be associated with a user (i.e., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of extensible video insertion control. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal processing and control module, code that is native to a particular device, a hardware abstraction layer for a particular device, and so on.

The device applications 818 also include any system components or modules to implement embodiments of extensible video insertion control. In this example, the device applications 818 can include a frame controller 822, such as when device 800 is implemented as a client device. Alternatively or in addition, the device applications 818 can include a video mapping service 824, such as when device 800 is implemented as a media content service. The frame controller 822 and the video mapping service 824 are shown as software modules and/or computer applications. Alternatively or in addition, the frame controller 822 and/or the video mapping service 824 can be implemented as hardware, software, firmware, or any combination thereof.

Device 800 also includes an audio and/or video rendering system 826 that generates and provides audio data to an audio system 828 and/or generates and provides display data to a display system 830. The audio system 828 and/or the display system 830 can include any devices that process, display, and/or otherwise render audio, display, and image data. Display data and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Although embodiments of extensible video insertion control have been described in language specific to features and/or methods, it is to be understood that the subject of the appended claims is not necessarily limited to the specific features or methods described. Rather, the specific features and methods are disclosed as example implementations of extensible video insertion control.

The invention claimed is:

1. A computer-implemented method, comprising:
    receiving, at a client device, a first video stream of a media asset to render as video for display;
    receiving, at the client device independent of the first video stream and from a video mapping service, a second video stream of mapped video data that identifies object insertion spaces in the media asset;
    receiving a selectable display object that conforms to an object insertion space in a scene of the media asset; and
    generating, from the media asset, the mapped video data, and the selectable display object, a composite video that includes the selectable display object inserted for display in the scene of the media asset at the object insertion space;
    receiving a content navigation input to jump advance past the scene of the media asset that includes the selectable display object inserted for display; and
    responsive to receiving the content navigation input, re-generating the composite video automatically to create a regenerated composite video that includes the selectable display object inserted for display in a subsequent scene of the media asset at a different object insertion space in the media asset.

2. A computer-implemented method as recited in claim 1, further comprising rendering the composite video to display the selectable display object in the scene of the media asset while the scene is displayed for viewing.

3. A computer-implemented method as recited in claim 1, further comprising:
    receiving an alternate selectable display object that also conforms to the object insertion space in the scene of the media asset; and
    selecting at least one of the selectable display object or the alternate selectable display object to insert for display in the scene of the media asset.

4. A computer-implemented method as recited in claim 3, further comprising re-generating the composite video to include the alternate selectable display object inserted for display in the scene of the media asset at the object insertion space.

5. A computer-implemented method as recited in claim 1, wherein the mapped video data is a rendering of synchronous movement of the object insertion space in the scene of the media asset.

6. A computer-implemented method as recited in claim 1, wherein the selectable display object correlates to a context of a viewer of the media asset.

7. A computer-implemented method as recited in claim 1, wherein said generating the composite video includes synchronizing frames of the scene that includes the object insertion space with the mapped video data to insert the selectable display object for display in the scene of the media asset.

8. A computer-implemented method as recited in claim 1, wherein the selectable display object is an advertisement and the object insertion space is a blank space within the scene of the media asset, the advertisement being displayed as at least one of a video or a static image over the blank space that moves in relation to objects displayed in the scene.

9. A client device, comprising:
one or more data inputs configured to:
receive a first video stream of a media asset to render as video for display at the client device;
receive a second video stream of mapped video data independent of the first video stream from a video mapping service at the client device, the mapped video data identifying object insertion spaces in the media asset;
receive a selectable display object that conforms to an object insertion space in a scene of the media asset, the selectable display object correlates to a context of a viewer of the media asset; and
at least a memory and a processor that implement a frame controller configured to:
generate a composite video that includes the selectable display object inserted for display in the scene of the media asset at the object insertion space;
receive a content navigation input to jump advance past the scene of the media asset that includes the selectable display object inserted for display; and
responsive to receiving the content navigation input, re-generate the composite video automatically to create a regenerated composite video that includes the selectable display object inserted for display in a subsequent scene of the media asset at a different object insertion space in the media asset.

10. A client device as recited in claim 9, further comprising a rendering system configured to render the composite video to display the selectable display object in the scene of the media asset while the scene is displayed for viewing.

11. A client device as recited in claim 9, wherein:
the one or more data inputs are further configured to receive an alternate selectable display object that also conforms to the object insertion space in the scene of the media asset; and
the frame controller is further configured to select at least one of the selectable display object or the alternate selectable display object to insert for display in the scene of the media asset.

12. A client device as recited in claim 9, wherein the frame controller is further configured to re-generate the composite video to include the alternate selectable display object inserted for display in the scene of the media asset at the object insertion space.

13. A client device as recited in claim 9, wherein the mapped video data is a rendering of synchronous movement of the object insertion space in the scene of the media asset.

14. A client device as recited in claim 9, wherein the frame controller is further configured to synchronize frames of the scene that includes the object insertion space with the mapped video data to insert the selectable display object for display in the scene of the media asset and generate the composite video.

15. A client device as recited in claim 9, wherein the selectable display object is an advertisement and the object insertion space is a blank space within the scene of the media asset, the advertisement being displayed as at least one of a video or a static image over the blank space that moves in relation to objects displayed in the scene.

16. A computer-readable storage memory comprising stored instructions that are executable and, responsive to executing the instructions by a processor of a computing device, the computing device:
selects a selectable display object for display in a scene of a media asset, the selectable display object correlates to a context of a viewer of the media asset;
receives a first video stream of the media asset to render as video for display at the client device;
receives mapped video data from a video mapping service as a second video stream independent of the first video stream at the client device, the mapped video data identifying object insertion spaces in the media asset, the mapped video data comprising one or more renderings of synchronous movement of an object insertion space in the scene of the media asset;
generates a composite video that includes the selectable display object inserted for display in the scene of the media asset at the object insertion space identified by the mapped video data;
receives a content navigation input to jump advance past the scene of the media asset that includes the selectable display object inserted for display; and
responsive to the content navigation input, re-generates the composite video automatically to create a regenerated composite video that includes the selectable display object inserted for display in a subsequent scene of the media asset at a different object insertion space in the media asset.

17. A computer-readable storage memory as recited in claim 16, further comprising additional instructions that are executable and, responsive to executing the additional instructions, the client device renders the composite video to display the selectable display object in the scene of the media asset while the scene is displayed for viewing.

18. A computer-readable storage memory as recited in claim 16, further comprising additional instructions that are executable and, responsive to executing the additional instructions, the client device synchronizes frames of the scene that includes the object insertion space with the mapped video data to insert the selectable display object for display in the scene of the media asset and generate the composite video.

19. A computer-readable storage memory as recited in claim 16, further comprising additional instructions that are executable and, responsive to executing the additional instructions, the client device:
receives an alternate selectable display object that conforms to the object insertion space in the scene of the media asset; and
selects at least one of the selectable display object or the alternate selectable display object to insert for display in the scene of the media asset.

20. A computer-readable storage memory as recited in claim 16, wherein the selectable display object is an advertisement and the object insertion space is a blank space within the scene of the media asset, the computer-readable storage memory further comprising additional instructions that are executable and, responsive to executing the additional instructions, the client device displays the advertisement as at least one of a video or a static image over the blank space that moves in relation to objects displayed in the scene.

* * * * *